United States Patent
Miyagawa

(10) Patent No.: US 9,422,861 B2
(45) Date of Patent: Aug. 23, 2016

(54) VEHICLE AIR-CONDITIONING CONTROL APPARATUS

(71) Applicant: MAZDA MOTOR CORPORATION, Hiroshima (JP)

(72) Inventor: Kazuhiro Miyagawa, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 110 days.

(21) Appl. No.: 14/191,254

(22) Filed: Feb. 26, 2014

(65) Prior Publication Data

US 2014/0261308 A1    Sep. 18, 2014

(30) Foreign Application Priority Data

Mar. 18, 2013 (JP) ................................ 2013-054787

(51) Int. Cl.
*F02D 41/08*  (2006.01)
*F02B 77/11*  (2006.01)
*B60H 1/00*   (2006.01)

(52) U.S. Cl.
CPC ........... *F02B 77/11* (2013.01); *B60H 1/00778* (2013.01); *B60H 1/00849* (2013.01)

(58) Field of Classification Search
CPC    F02B 77/11; B60H 1/00778; B60H 1/00849
USPC ............... 123/179.3, 179.4, 179.18, 339.17, 123/339.18; 701/103; 236/13
See application file for complete search history.

(56) References Cited

U.S. PATENT DOCUMENTS 4,974,776 A    12/1990  Oshizawa
6,016,964 A *  1/2000  Ohkubo ............. B60H 1/00835
                                              165/202

(Continued)

FOREIGN PATENT DOCUMENTS

JP    2001-141308 A    5/2001
JP    2002-362137 A    12/2002

(Continued)

OTHER PUBLICATIONS

An Office Action; "Notice of Reasons for Rejection," issued by the Japanese Patent Office on Aug. 13, 2015, which corresponds to Japanese Patent Application No. 2013-054787 and is related to U.S. Appl. No. 14/191,254; with English language summary.

(Continued)

*Primary Examiner* — Hai Huynh
(74) *Attorney, Agent, or Firm* — Studebaker & Brackett PC

(57) ABSTRACT

A vehicle air-conditioning control apparatus has: an air mix damper; an actuator for driving the air mix damper; a target opening degree determination device operable to determine a target opening degree of the air mix damper; a drive frequency reduction device operable, during automatic stop of an engine, to reduce a drive frequency of the actuator; a target opening degree correction device operable, during automatic stop of the engine and when a current target opening degree is greater than a previous target opening degree, to increase the current target opening degree, and, when the current target opening degree is less than the previous target opening degree, to reduce the current target opening degree; and a drive control device operable, during running of the engine, to control the actuator based on the target opening degree, and, during automatic stop of the engine, to control the actuator the corrected target opening degree.

5 Claims, 13 Drawing Sheets

(56) References Cited

U.S. PATENT DOCUMENTS

| | | | |
|---|---|---|---|
| 6,134,895 A * | 10/2000 | Poloskey | B60H 1/00849 165/249 |
| 8,531,053 B2 * | 9/2013 | Choi | B60K 6/48 180/65.265 |
| 2002/0185546 A1 | 12/2002 | Homan et al. | |
| 2010/0050671 A1 * | 3/2010 | Kahn | B60H 1/00378 62/190 |
| 2011/0010015 A1 | 1/2011 | Jordan et al. | |
| 2012/0152512 A1 | 6/2012 | Mori | |

FOREIGN PATENT DOCUMENTS

| | | |
|---|---|---|
| JP | 2003-341337 A | 12/2003 |
| JP | 2010-076517 A | 4/2010 |
| JP | 2010-143552 A | 7/2010 |
| JP | 2012-126330 A | 7/2012 |

OTHER PUBLICATIONS

An Office Action issued by the German Patent Office on Sep. 9, 2014, which corresponds to German Patent Application No. 10 2014 002 989.1 and is related U.S. Appl. No. 14/191,254; with English language translation.

An Office Action issued by the Chinese Patent Office on Oct. 28, 2015, which corresponds to Chinese Patent Application No. 201410069805.1 and is related to U.S. Appl. No. 14/191,254; with English language summary.

An Office Action; "Notification of Reasons for Refusal," issued by the Japanese Patent Office on Mar. 29, 2016, which corresponds to Japanese Patent Application No. 2013-054812 and is related to U.S. Appl. No. 14/191,254; with English language translation.

\* cited by examiner

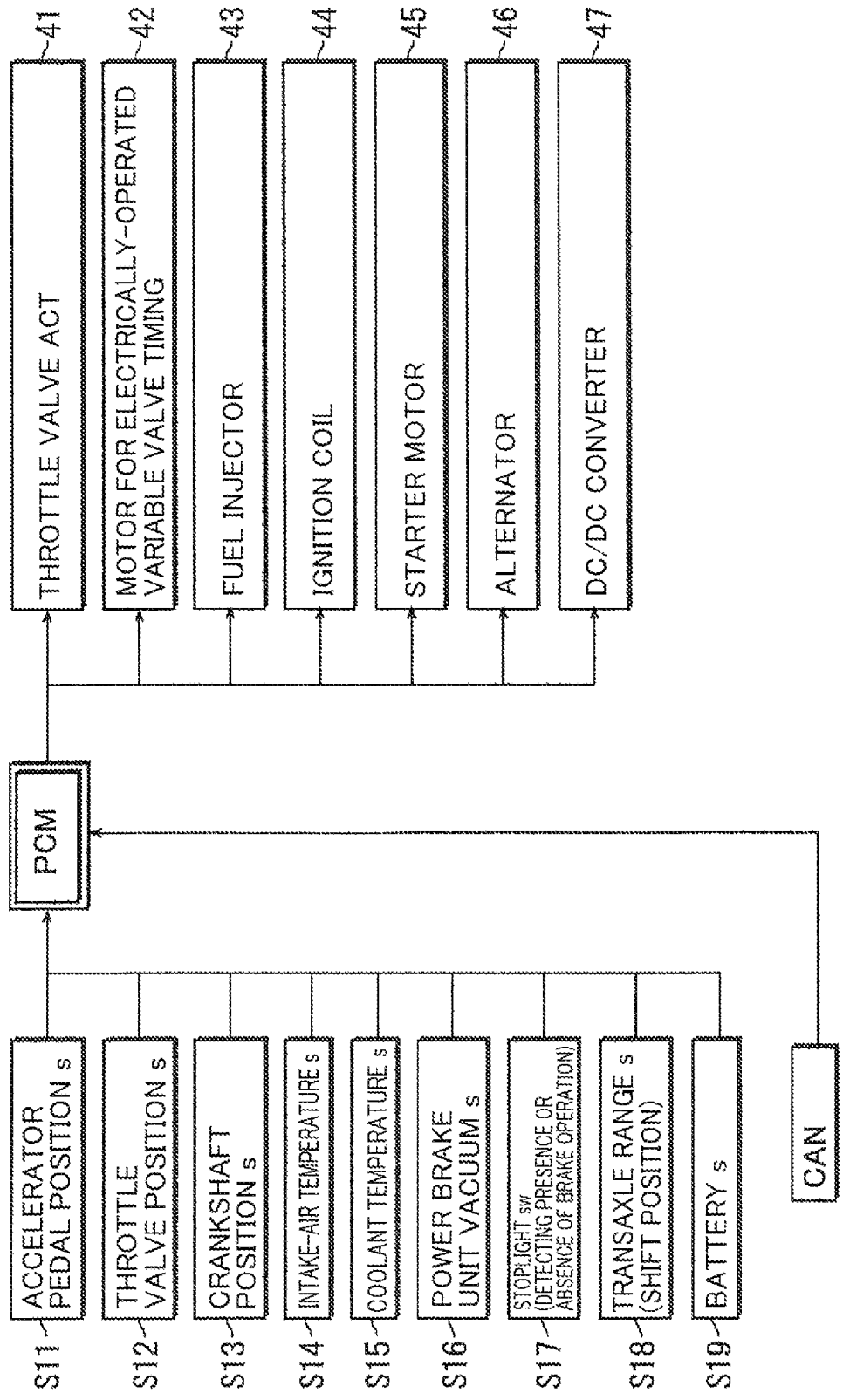

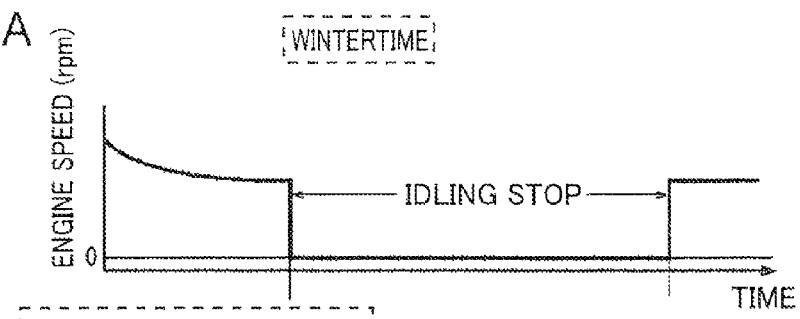
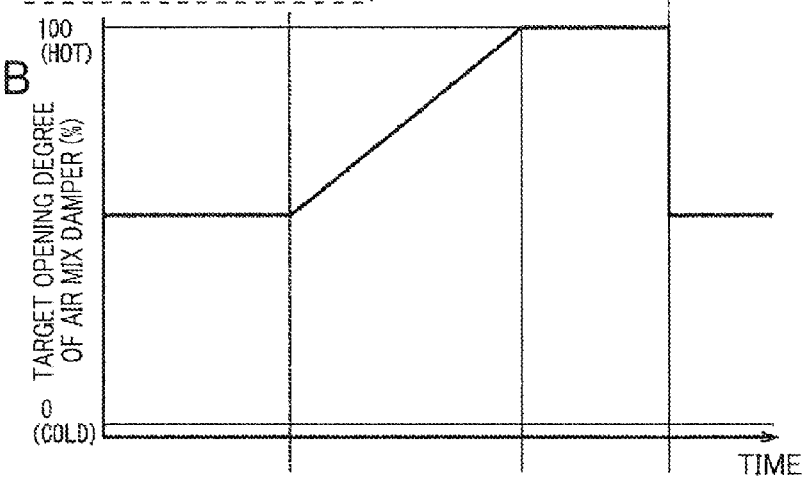
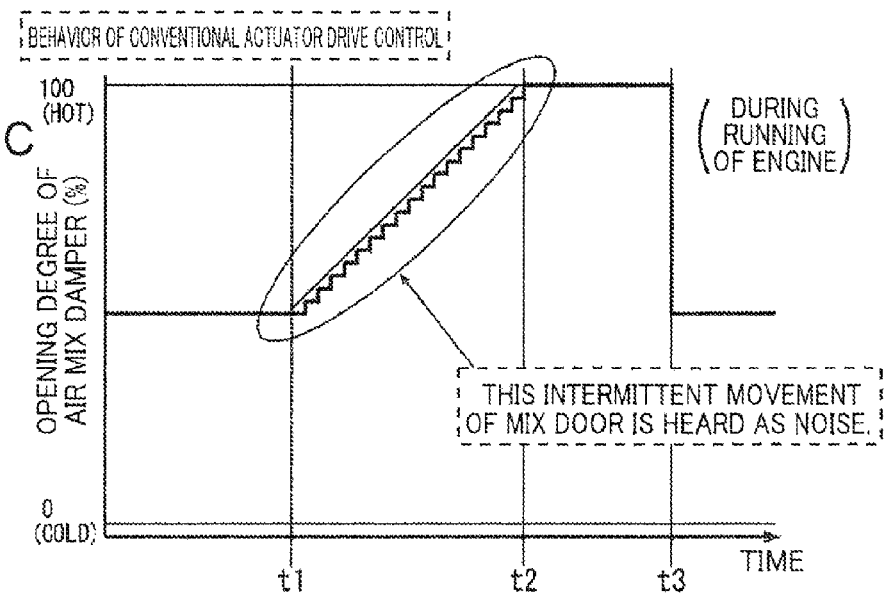

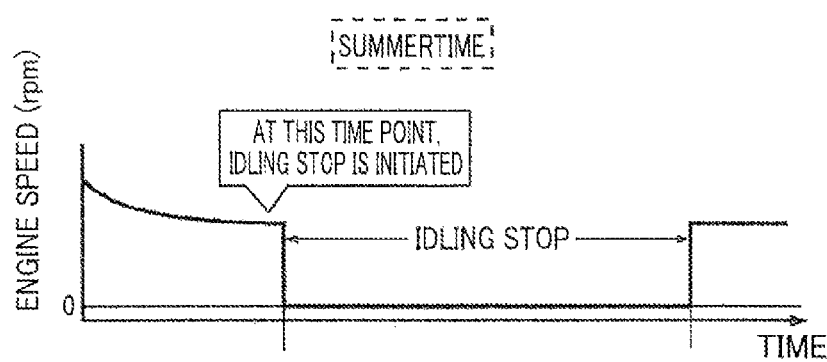
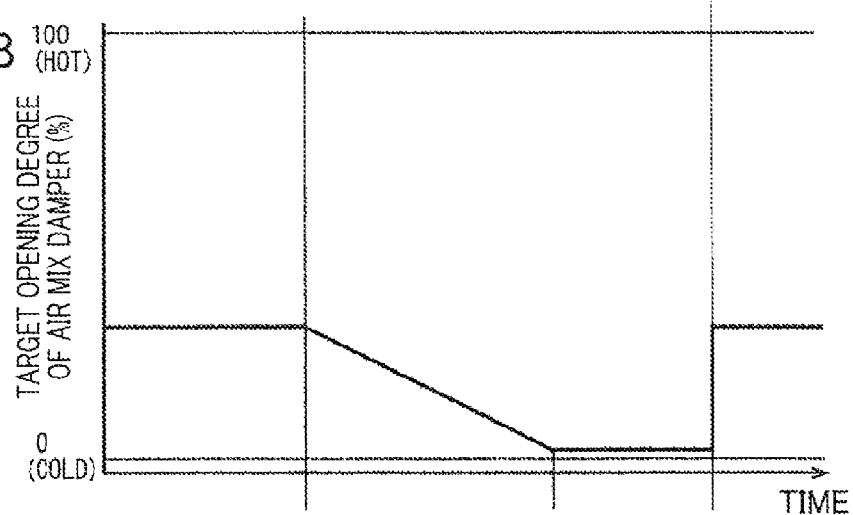
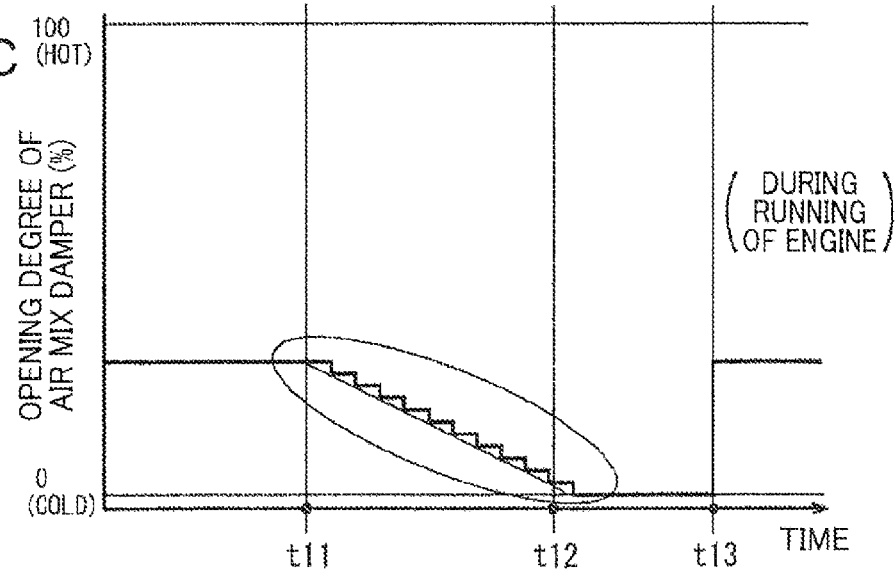

VEHICLE AIR-CONDITIONING CONTROL APPARATUS

BACKGROUND OF THE INVENTION

1. Field of the Invention

The present invention relates to a vehicle air-conditioning control apparatus.

2. Background Art

A vehicle air-conditioning control apparatus is provided with: a cool-air generator comprising a compressor, a condenser and an evaporator; and a warm-air generator utilizing an engine coolant as a heat source, and is configured to control an air mix damper to change a mixing ratio between cool air and warm air to thereby obtain conditioned air having a desired temperature. Then, the conditioned air will be supplied into a vehicle interior (vehicle passenger compartment) by a blower, wherein a supply amount of the conditioned air is changed by changing a rotational speed of the blower. Generally, the compressor is driven by an engine, and a water pump for circulating the coolant is also driven by the engine. Thus, when the engine is stopped, the compressor and the water pump are stopped, so that a cool-air generating function and a warm-air generating function are ceased.

Further, in the field of vehicle air-conditioning control apparatuses, an automatic air-conditioning type configured to automatically control an actual vehicle interior temperature to conform to a target vehicle interior temperature has become mainstream. The air-conditioning automatic control is performed in accordance with parameters indicative of an environmental condition inside a vehicle interior, an environmental condition outside the vehicle interior, and a passenger's manual air-conditioning operation state (particularly, a manual set value of the target vehicle interior temperature), to automatically set a blow temperature of conditioned air, a blow port of conditioned air, a blow amount of conditioned air and others.

Meanwhile, in recent vehicles, with a view to improving fuel economy, a technique of automatically stopping an engine when a vehicle is stopped or at a very low vehicle speed just before stopping the vehicle, so-called "idling stop", has been increasingly employed. The idling stop is executed only if a preset initiation condition is satisfied. Generally, the initiation condition is set as a condition that all of a plurality of sub-conditions, such as: a sub-condition that a vehicle speed is zero (the vehicle is in a stopped state); a sub-condition that a brake is in an operated state; a sub-condition that an accelerator is in a non-operated state; and a sub-condition that a transmission is in a D position, are satisfied.

While the cool-air generator and the warm-air generator are stopped when the engine is automatically stopped, it is desirable to continue the air-conditioning control as much as possible, even during automatic stop of the engine. For this purpose, for example, JP 2010-143552A discloses, even during automatic stop of an engine, determining a target opening degree of an air mix damper, and drivingly controlling the air mix damper to allow an opening degree thereof to conform to the target opening degree.

In this context, it was found that, if the air-conditioning automatic control is continued during automatic stop of the engine, a noise (undesired sound) problem occurs. This will be described below. Upon stop of the engine, the cool-air generator in a cold state will gradually become warmer, and the warm-air generator in a warm state will gradually become colder. Thus, even in the same surrounding environment, during automatic stop of the engine, the target opening degree is frequently changed as compared to during running of the engine, so that an air mix damper-driving actuator will be alternately placed in driven and un-driven states frequently. Then, a passenger will feel noise generation every time the actuator is driven. In particular, as compared to during running of the engine, a surrounding noise level becomes lower during automatic stop of the engine, so that the passenger becomes more sensitive to drive noise of the actuator.

SUMMARY OF THE INVENTION

It is an object of the present invention to provide a vehicle air-conditioning control apparatus capable of preventing or suppressing noise due to a change in opening degree of an air mix damper during automatic stop of an engine.

According to one aspect of the present invention, there is provided a vehicle air-conditioning control apparatus which is installed in a vehicle capable of performing automatic stop and automatic restart of an engine in accordance with a preset given condition. The vehicle air-conditioning control apparatus comprises: an air mix damper for changing a mixing ratio between cool air generated by a cool-air generator and warm air generated by a warm-air generator to thereby produce conditioned air having a desired temperature; an actuator for driving the air mix damper; a target opening degree determination device operable to determine a target opening degree of the air mix damper; a drive frequency reduction device operable, during automatic stop of the engine, to reduce a drive frequency of the actuator as compared to during running of the engine; a target opening degree correction device operable, during automatic stop of the engine and when a current target opening degree determined by the target opening degree determination device this time is greater than a previous target opening degree determined by the target opening degree determination device last time, to increase the current target opening degree just by a given opening degree, and set the resulting opening degree as a corrected target opening degree, and, during automatic stop of the engine and when the current target opening degree is less than the previous target opening degree, to reduce the current target opening degree just by a given opening degree, and set the resulting opening degree as a corrected target opening degree; and a drive control device operable, during running of the engine, to drivingly control the actuator to allow the air mix damper to have an opening degree conforming to the target opening degree determined by the target opening degree determination device, and, during automatic stop of the engine, to drivingly control the actuator to allow the air mix damper to have an opening degree conforming to the corrected target opening degree corrected by the target opening degree correction device.

BRIEF DESCRIPTION OF THE DRAWINGS

FIG. 5 is a diagram illustrating one example of an engine automatic stop control sub-system.

FIG. 6A is a time chart illustrating the operating conditions of the engines at the time of the Idling stop, FIG. 6B is a time chart illustrating the transition of the target value of air mix damper during heating, and FIG. 6C is a time chart illustrating the drive control example of air mix damper during heating and during running of an engine.

FIG. 9A is a time chart illustrating the operating conditions of the engines at the time of the Idling stop, FIG. 9B is a time chart illustrating the transition of the target value of air mix damper during cooling, and FIG. 9C is a time chart illustrating the drive control example of air mix damper during cooling and during running of the engine.

DETAILED DESCRIPTION OF THE PREFERRED EMBODIMENTS OF THE INVENTION

Based on the drawings, an embodiment of the present invention will now be described.

Figure 1:
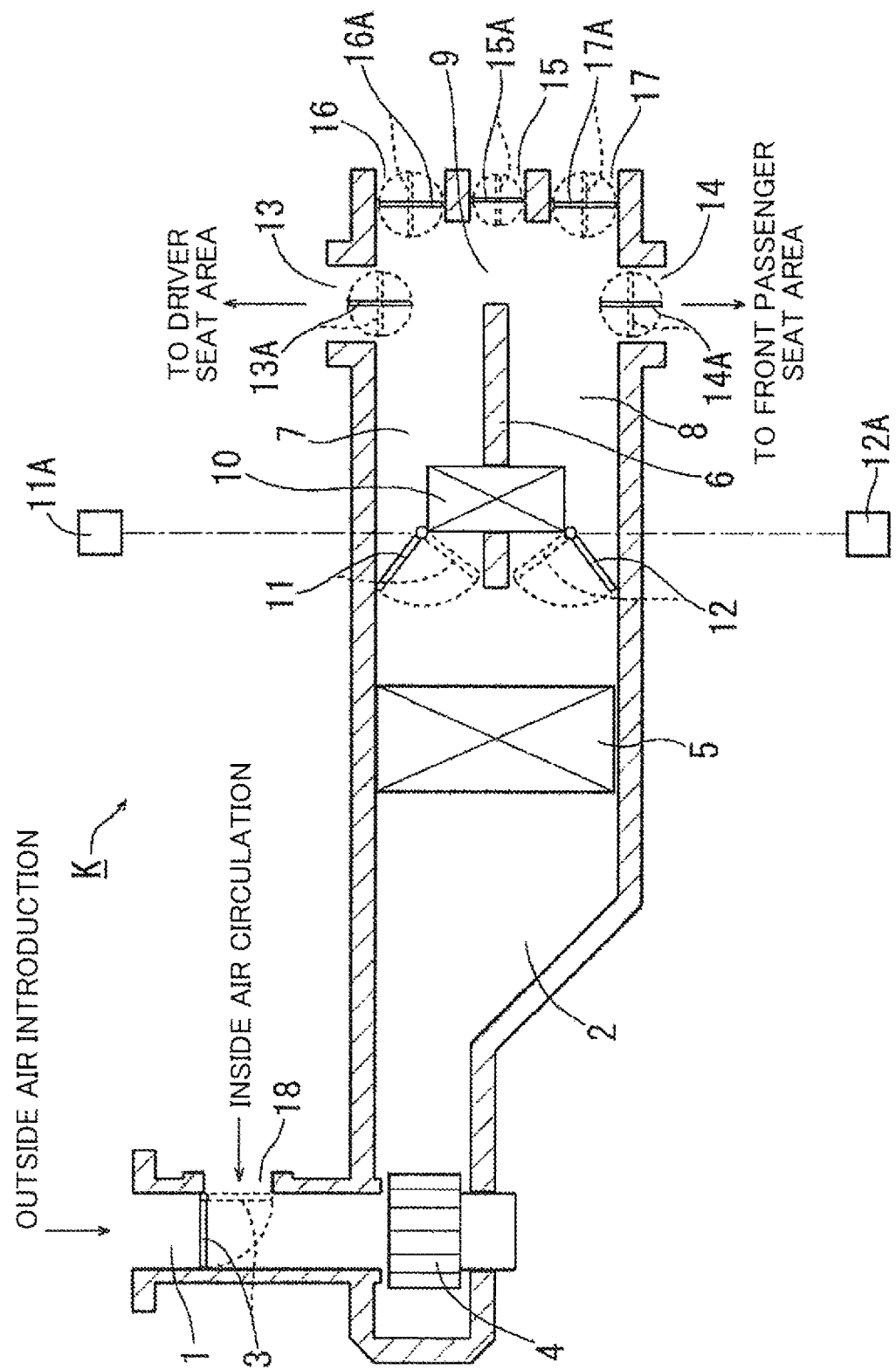
FIG. 1 is a system diagram illustrating one example of an air-conditioning system (corresponding to a vehicle air-conditioning control apparatus of the present invention).

FIG. 1 illustrates one example of a passage configuration of an air-conditioning system K (corresponding to a vehicle air-conditioning control apparatus of the present invention). The air-conditioning system K is a well-known type, and therefore will be briefly described as follows. In a passage portion 2 having an outside-air inlet port 1, a switching damper 3 (in FIG. 4, it is presented as inside-outside air damper), a blower 4 (in FIG. 4, it is presented as blower fan), and an evaporator 5 are disposed in this order in a direction from an upstream side (the outside-air inlet port 1) toward a downstream side of the passage portion 2. A region of the passage portion 2 downstream of the evaporator 5 is partitioned by a partition wall 6 into two independent passages 7, 8 extending parallel to each other, and downstream sides of the independent passages 7, 8 are joined together to form a common chamber 9.

The partition wall 6 holds a heater core 10 in such a manner as to protrude into each of the two independent passages 7, 8. An air mix damper 11 is provided in the independent passage 7 at a position immediately upstream of the heater core 10. Similarly, an air mix damper 12 is provided in the independent passage 8 at a position immediately upstream of the heater core 10. A driver seat-area air passage 13 is opened in the passage portion 2 to face the independent passage 7 upstream of the common chamber 9. A front passenger seat-area air passage 14 is also opened in the passage portion 2 to face the independent passage 8 upstream of the common chamber 9. Further, a plurality of air passages 15 to 17 are opened to face the common chamber 9. The air passage 15 is used, e.g., for a defroster, and the air passages 16, 17 are used, e.g., for side vents. Five opening degree-adjusting mode dampers 13A to 17A are provided, respectively, in the air passages 13 to 17.

When an opening degree (position) of the air mix damper 11 is changed, a rate at which cooling air passing through the evaporator 5 is routed through the heater core 10 in the independent passage 7 is changed, so that a temperature and humidity of air just after passing through the independent passage 7 are adjusted. Air just after passing through the independent passage 7 will be supplied to a driver seat area. The air mix damper 11 is configured to be driven by an electric motor (equivalent to "actuator" set forth in the appended claims 11A, so as to have any opening degree within the range of 0% to 100%.

When an opening degree (position) of the air mix damper 12 is changed, a rate at which cooling air passing through the evaporator 5 is routed through the heater core 10 in the independent passage 8 is changed, so that a temperature and humidity of air just after passing through the independent passage 8 are adjusted. Air just after passing through the independent passage 8 will be supplied to a front passenger seat area. The air mix damper 12 is configured to be driven by an electric motor (equivalent to "actuator" set forth in the appended claims 12A, so as to have any opening degree within the range of 0% to 100%.

As is clear from the above description, in this embodiment, air-conditioning for the driver seat area and air-conditioning for the front passenger seat area can be controlled individually. Further, when the opening degree of each of the air mix dampers 11, 12 is set to 100% as indicated by the solid line in FIG. 1, an air-conditioning temperature for a respective one of the driver seat area and the front passenger seat area is set to an uppermost value. On the other hand, when the opening degree of each of the air mix dampers 11, 12 is set to 0% as indicated by the broken line in FIG. 1, the air-conditioning temperature for a respective one of the driver seat area and the front passenger seat area is set to a lowermost value. Mixed air formed by combining conditioned air flows passing through the independent passages 7, 8 is supplied to each of the air passages 15 to 17.

In FIG. 1, the reference code 18 indicates an inside-air inlet port provided adjacent to the outside-air inlet port 1, wherein the switching damper 3 is operable to switch between an outside air introduction mode and an inside air circulation mode.

Figure 2:
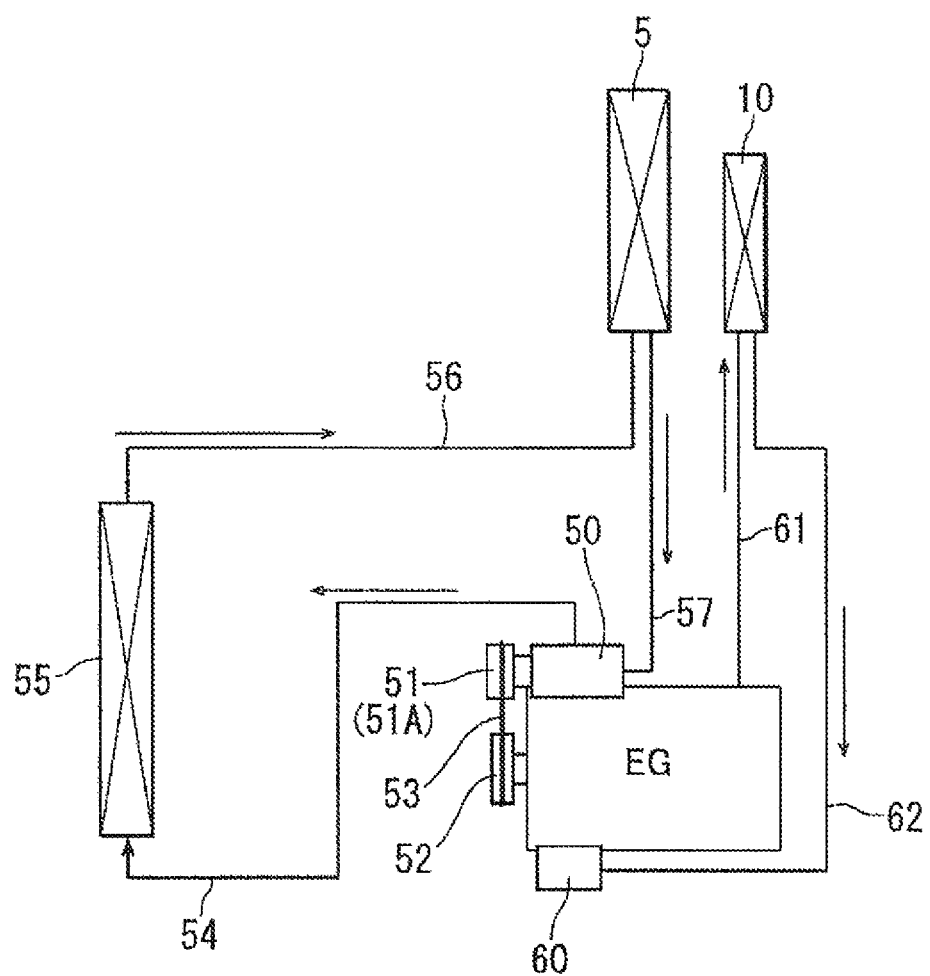
FIG. 2 is a diagram illustrating one example of a cool-air generator and a warm-air generator.

FIG. 2 illustrates a circulation pathway of a cooling medium for the evaporator 5, and a circulation pathway of an engine coolant for the heater core 10. In FIG. 2, a belt 53 is wound around between a pulley 51 attached onto a rotary shaft of a compressor 50, and a pulley 52 attached to an engine EG (a crankshaft), so that the compressor 50 is configured to be rotationally driven by the engine EG. The cooling medium is compressed by the compressor 50, and supplied to the evaporator 5 via a pipe 54, a condenser 55 and a pipe 56. The cooling medium supplied to the evaporator 5 is subjected to heat exchange with air passing through the evaporator 5, and then returned to the compressor 50 via a pipe 57. The compressor 50, the condenser 55 and the evaporator 5 serve as main components of a cool-air generator. A compressor clutch 51A is incorporated in the pulley 51, and is capable of appropriately stopping drive of the compressor 50, even during running of the engine EG.

Concurrently, cooling water from a water pump 60 configured to be driven by the engine EG is supplied to the heater core 10 via a pipe 61, and subjected to heat exchange with air passing through the heater core 10. Subsequently, cooling water in the heater core 10 is returned to the water pump 60 via a pipe 62. The water pump 60 and the heater core 10 serve as main components of a warm-air generator.

Figure 3:
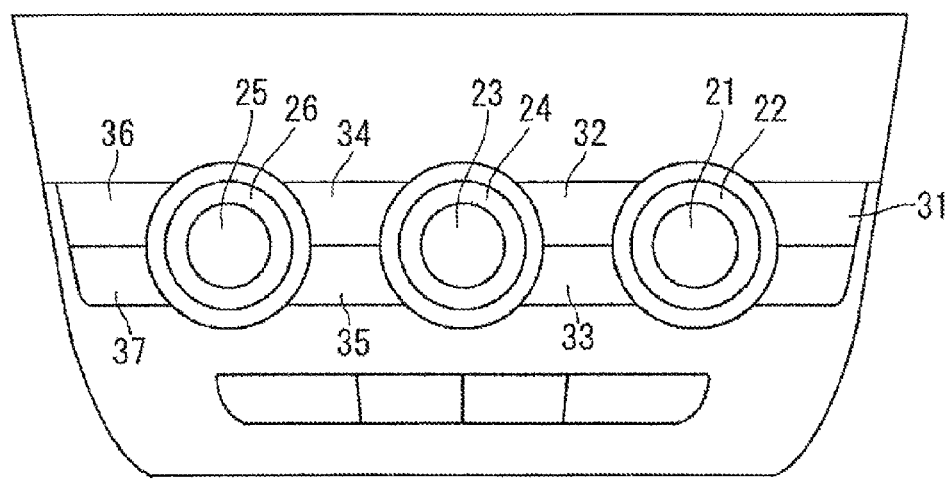
FIG. 3 is a diagram illustrating one example of an air-conditioning operation panel.

FIG. 3 illustrates one example of an air-conditioning panel unit KP configured to be manually operated by a passenger, wherein it is set up in an instrument panel. In this embodiment, the unit is compatible with a system in which a driver seat area and a front passenger seat area can be temperature-controlled in a bilaterally independent manner, and switches to be manually operated by a passenger are set as follows.

Figure 4:
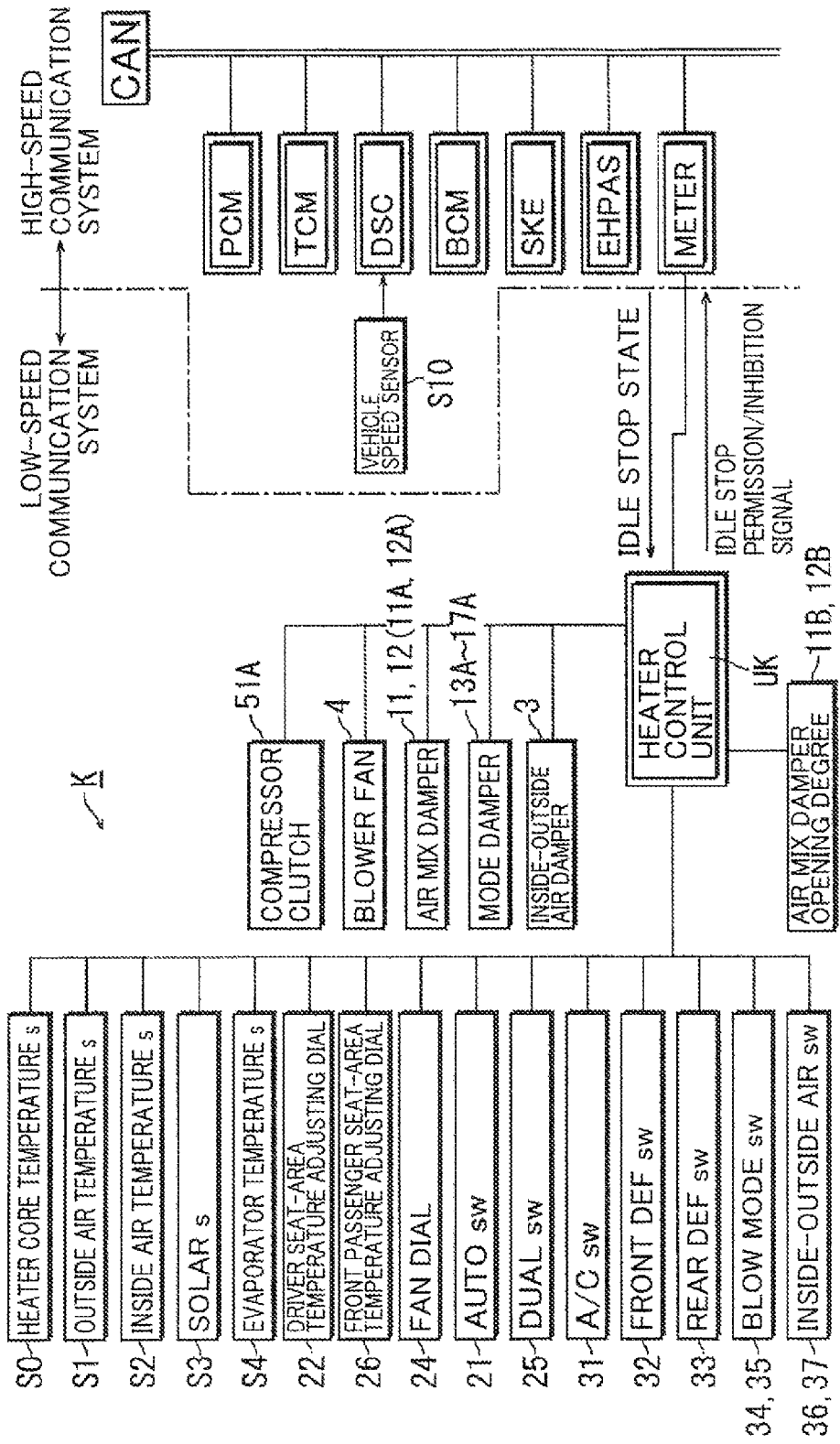
FIG. 4 is a diagram illustrating one example of a control sub-system in the air-conditioning system.

First of all, a switch 21 is a main switch for turning on an automatic air-conditioning mode, and composed of a push type (in FIG. 4, it is presented as AUTO sw). A switch 22 is a temperature setting switch for the driver seat area, and composed of a dial type (in FIG. 4, it is presented as driver seat-area temperature adjusting dial). A switch 23 is an off switch for the automatic air-conditioning mode, and composed of a push type. A switch 24 is an air amount adjusting switch, and composed of a dial type (in FIG. 4, it is presented as FAN dial). A switch 25 is manually operated when it is necessary to select a temperature of the front passenger seat area, separately, and composed of a push type (in FIG. 4, it is presented as DUAL sw). A switch 26 is a temperature setting switch for the front passenger seat area, and composed of a dial type (in FIG. 4, it is presented as front passenger seat-area temperature adjusting dial).

A switch 31 is an off switch for the air-conditioning system (in FIG. 4, it is presented as A/C sw). A switch 32 is a front defroster-activating switch (in FIG. 4, it is presented as front DEF sw). A switch 33 is a rear defroster-activating switch (in FIG. 4, it is presented as rear DEF sw). Each of two switches 34, 35 is a conditioning air blow port-selecting switch (in FIG. 4, it is presented as blow mode sw). A switch 36 is an outside air introduction-selecting switch, and a switch 37 is an inside air circulation-selecting switch (in FIG. 4, the switches 36, 37 are collectively presented as inside-outside air sw). Each of the switches 31 to 37 is composed of a push type.

FIG. 4 illustrates one example of a control sub-system in the air conditioning system K. In FIG. 4, the code UK indicates an air-conditioning system controller (control unit; in FIG. 4, it is presented as heater control unit) constructed using a microcomputer. In this example, the controller UK is equivalent to "target opening degree determination device", "drive frequency reduction device", "target opening degree correction device" and "drive control device" as set forth in the appended claims.

The controller UK is configured to receive inputs of: signals from the aforementioned various switches; signals indicative of a temperature of the heater core 10 detected by a heater core temperature sensor S0, an outside air temperature detected by an outside air temperature sensor S1, a vehicle interior temperature detected by an inside air temperature sensor S2, a vehicle interior sunlight intensity detected by a solar sensor S3, and a temperature of the evaporator 5 detected by an evaporator temperature sensor S4; and signals from air mix damper opening degree sensors 11B, 12B (hereinafter abbreviated as to "opening degree sensors 11B, 12B"; equivalent to "actual opening degree detection device" as set forth in the appended claims) each operable to detect an actual opening degree of a respective one of the air mix dampers 11, 12. Further, the controller UK is configured to control: the aforementioned devices 3, 4, 11 (11A), 12 (12A), 13A to 17A, such as dampers; and the compressor clutch 51A interposed in a driving force transmission line between the engine and the cooling medium-compressing compressor (additionally see FIG. 2). The controller UK and each of the above sensors, switches and devices are connected by a low-speed communication system.

Fundamentally, the controller UK is operable, in accordance with vehicle inside and outside environmental conditions detected by the various sensors 50 to 54, and a switch setting state operated by a passenger, to set a target vehicle interior temperature, and automatically control an blow amount of conditioned air, a temperature of conditioned air, a selection of conditioned air blow ports and others to become suitable for allowing an actual vehicle interior temperature to conform to the target vehicle interior temperature.

The controller UK comprised in the low-speed communication system is connected to a high-speed communication system (CAN). The high-speed communication system comprises: a PCM (Powertrain Control Module) for performing engine control including engine automatic stop and engine automatic restart; a TCM (Transmission Control Module) for performing speed change control of an automatic transmission; a DSC (Dynamic Stability Control module) for performing brake control including automatic brake control when automatically stopping the engine; a BCM (Body Control Module) for performing control associated with a vehicle body, including a detection of open and closed states of doors; a keyless control module (presented as SKE) for performing control for smart keyless entry, including a detection of misplacement of a car key within a vehicle; and EHPAS (Electric Hydraulic Power Assist Steering system) for performing power steering control. The controller UK is configured to receive, from the PCM, an input of information about an idling stop state, and output, therefrom, an idling stop permission or inhibition signal to the PCM, depending on a state of air-conditioning control, as described later. Further, a vehicle speed sensor S10 is connected to the DSC, and a vehicle speed signal detected by the vehicle speed sensor S10 is input into the controller UK and the PCM via the CAN.

FIG. 5 illustrates one example of a detailed control sub-system of the PCM for performing control associated with idling stop. In FIG. 5, the PCM is configured to receive inputs of signals from various sensors or switches S10 to S19. The sensor S11 is an accelerator pedal position sensor for detecting an accelerator opening degree. The sensor S12 is a throttle valve position sensor for detecting a throttle opening degree. The sensor S13 is a crankshaft position sensor for detecting a rotational angle position of a crankshaft. The sensor S14 is an intake-air temperature sensor for detecting an intake-air temperature. The sensor S15 is a coolant temperature sensor for detecting an engine coolant temperature. The sensor S16 is a power brake unit vacuum sensor for detecting a vacuum in a brake system equipped with a vacuum booster. The switch S17 is a brake switch for detecting that a brake pedal is depressed (it also serves as a stoplight switch). The switch S18 is a transaxle range sensor (shift position sensor) for detecting a range position of an automatic transmission. The switch S19 is a battery sensor for comprehensively detecting a charge amount, voltage, current consumption, etc., of a battery.

The PCM is configured to control the following devices 41 to 47 in connection with engine automatic stop (idling stop) and automatic restart controls. The device 41 is an actuator for driving a throttle valve, and configured to be controlled when automatically stopping the engine, to operate to fully close the throttle valve. The device 42 is a drive motor for an electrically-operated variable valve timing apparatus, and configured to be controlled when automatically stopping the engine, to operate to delay an opening-closing timing of an intake valve in preparation for automatic restart. The device 43 is a fuel injector, and configured to be controlled when automatically stopping the engine, to operate to stop fuel injection. The device 44 is an ignition coil, and configured to be controlled when automatically stopping the engine, to be placed in a state in which current supply thereto is stopped and thereby inhibited from ignition. The device 45 is a starter motor, and configured to be controlled when automatically restarting the engine, to be driven. The device 46 is an alternator, and configured to be controlled when automatically stopping the engine, to increase a load thereof to thereby reduce an engine speed. The device 47 is a DC/DC converter, and configured to be controlled during engine cranking for engine automatic restart, to operate to compensate for lowering in battery power.

The idling stop for automatically stopping the engine is performed when stopping the vehicle. This is executed only if even one of the following sub-conditions making up an idling stop inhibition condition is not satisfied.

Automatic Stop Inhibition Condition (Idling stop Inhibition Condition)
(1) The vehicle speed is not zero.
(2) No brake operation by a passenger is performed.
(3) The accelerator pedal is depressed.
(4) The battery is in the following state: a battery voltage is equal to or less than a given value; a charge amount is equal to or less than a preset given value; a current consumption is equal to or greater than a preset given value; or a battery control system is in an abnormal state (when an abnormal signal is generated).
(5) A steering wheel angle is not within a given small angular range with respect to a neutral position of a steering wheel.
(6) The transmission is in the following state: the transmission is not in a D range position; an oil temperature is not within a given temperature range; an oil pressure is not within a given pressure range, and a transmission abnormal signal is generated; or a clutch (including a lockup clutch) has an abnormality.
(7) The engine is in the following state: the engine coolant temperature is not within a given temperature range; the intake-air temperature is excessively high; or an atmospheric pressure is relatively low.
(8) A vacuum in the vacuum booster-equipped brake system is insufficient, or a signal indicative of abnormality of an engine system is generated.
(9) A system associated with the vehicle body is in the following state: an ignition key is carried out of a vehicle (in case of a smart keyless entry system); a seat belt is detached; any door is opened; or a hood (bonnet) is opened.
(10) A road surface has a large inclined angle.
(11) An automatic stop inhibition signal is output from the air-conditioning controller UK. This condition will be described in detail later.

The above automatic stop inhibition condition is described by way of example only, and may additionally comprise any other suitable sub-condition. For example, it may further comprise a sub-condition that an IS (Idling Stop) cancel switch for cancelling (inhibiting) the engine automatic stop by a driver's intention is turned on, or a sub-condition that the engine speed is equal to or greater than a preset value (fairly greater than a stable idling speed). Conversely, the automatic stop inhibition condition may be set by eliminating a part of the above sub-conditions.

An automatic restart condition for automatically restarting the automatically stopped engine, i.e., the engine in the idling stop state, may be set as a condition that the unsatisfied state of any one of the above sub-conditions of the automatic stop inhibition condition is released. It is particularly preferable to set, as the automatic restart condition, at least a condition that the brake operation by a passenger is released.

Next, an automatic stop inhibition condition associated with the air-conditioning system K will be described. The air-conditioning automatic control is performed to allow an actual vehicle interior temperature detected by the inside air temperature sensor S2 to come close to a target vehicle interior temperature set based on the temperature adjusting dials 22, 26 selected by a passenger. During the air-conditioning automatic control, a temperature of conditioned air, a selection of conditioned air blow ports, a blow amount of conditioned air, etc., are automatically adjusted.

The air-conditioning controller UK outputs a inhibition signal for inhibiting the engine automatic stop when stopping the vehicle so as to give priority to air-conditioning, on the following sub-conditions. On the other hand, when the air-conditioning controller UK does not output the automatic stop inhibition signal, it outputs an automatic stop permission signal.

Automatic Stop Inhibition Conditions to be Set from Air-Conditioning System
(1) Abnormality occurs in any of various sensors and switches in the air-conditioning system K.
(2) The outside air temperature is significantly high (e.g., 40° C. or more) or significantly low (e.g., −10° C. or less).
(3) The defroster is used (priority is given to ensuring visibility).
(4) A vehicle interior temperature selectively set by a passenger is a high temperature-side upper limit (a demand for heating is significantly strong).
(5) The vehicle interior temperature selectively set by a passenger is a low temperature-side lower limit (a demand for cooling is significantly strong).
(6) A deviation between a target vehicle interior temperature and an actual vehicle interior temperature is greater than a given value.

The air-conditioning controller UK is configured to perform air-conditioning control, as long as the automatic stop inhibition condition is not satisfied, i.e., even during automatic stop of the engine. However, the air-conditioning control during automatic stop of the engine is performed in a different manner from that during running of the engine, in order to prevent or suppress noise due to drive of (the motors 11A, 12A for) the air mix dampers. Although an example of anti-noise control will be described below with a focus on drive control of the air mix damper 11 (motor 11A), it is to be understood that the air mix damper 12 (motor 12A) is controlled in the same manner.

First of all, FIG. 6 illustrates an example of air-conditioning control during heating in wintertime. In FIG. 6A, the engine being running is automatically stopped at Time t1, and subsequently automatically restarted at Time t3. That is, the period between t1 and t3 is a so-called "idling stop period". During automatic stop of the engine, a heating action of the heater core 10 will be gradually deteriorated. Thus, as illustrated in FIG. 6B, an opening degree of the air mix damper 11 necessary for maintaining a desired temperature will be gradually increased toward 100% in such a manner as to increase a rate of air passing through the heater core 10.

During running of the engine, a target opening degree of the air mix damper 11 is calculated at intervals of a given, relatively short cycle time (e.g., 2 seconds). Thus, a change in opening degree of the air mix damper 11 is fundamentally performed at intervals of the above relatively short cycle time. That is, as illustrated in FIG. 6C, the opening degree of the air mix damper 11 will be gradually increased at intervals of a relatively short cycle time (in a finely stepped pattern). During running of the engine, a surrounding environment noise level is relatively high due to engine noise and resulting vehicle body vibration noise. Thus, even if the change in opening degree of the air mix damper 11 is performed at intervals of a relatively short cycle time, noise due to the change in opening degree of the air mix damper 11 (drive of the motor 11A) causes no problem. In this connection, when a deviation between an actual opening degree and the target opening degree of the air mix damper 11a is less than a given threshold value, the change in opening degree of the air mix damper 11 is not performed.

During automatic stop of the engine, the change in opening degree of the air mix damper 11 is performed at intervals of a constant cycle time longer than that during running of the engine (e.g., 15 seconds) (the cycle time for calculation of the target opening degree is the same as that during running of the engine). Furthermore, in this embodiment, the opening degree of the air mix damper 11 is changed while causing overshoot with respect to the target opening degree. FIG. 8 illustrates one example of control in which overshoot is generated while setting a drive cycle time to a constant and relatively long value. On the other hand, FIG. 7 illustrates one example of control in which no overshoot is generated although the drive cycle time is increased.

Figure 7:
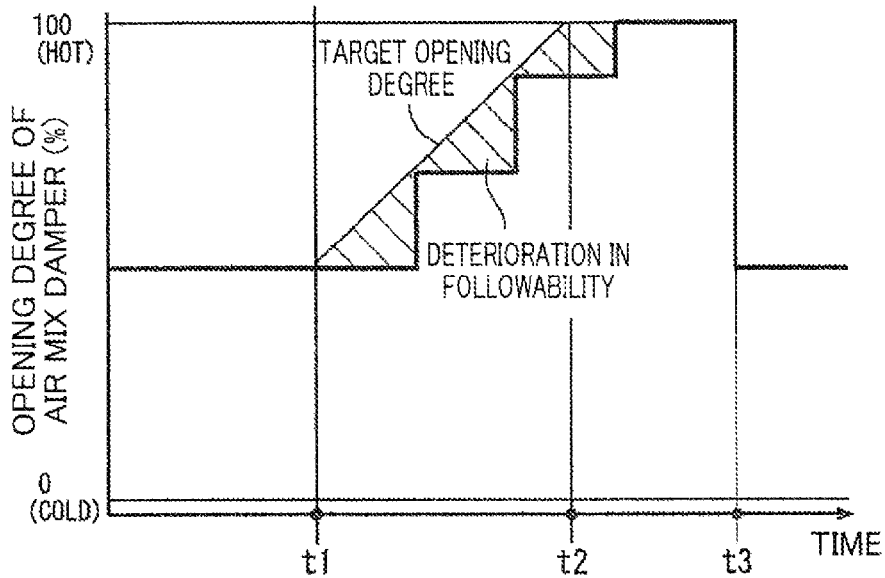
FIG. 7 is a time chart illustrating one example of reference control in which a change in opening degree of an air mix damper during heating and during automatic stop of the engine is performed without overshoot.
Figure 8:
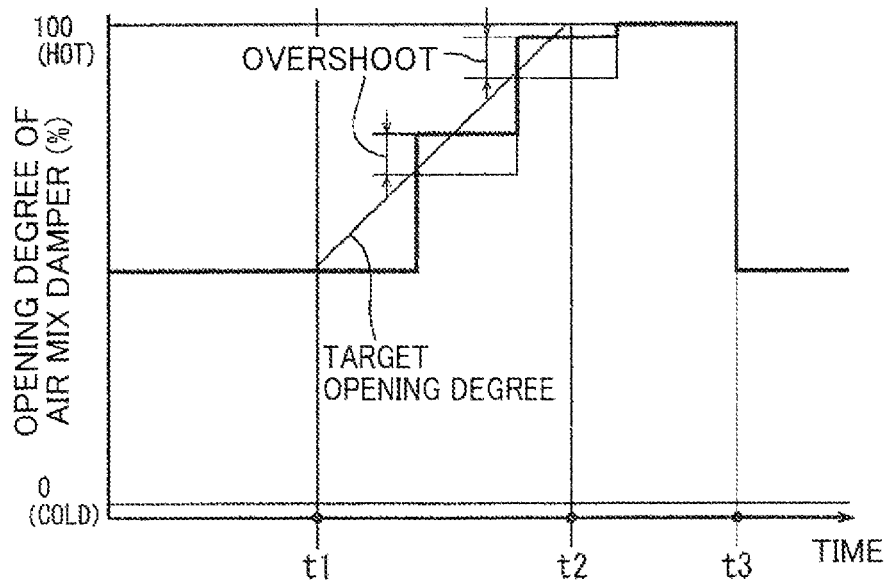
FIG. 8 is a time chart illustrating one example of control in which the change in opening degree of the air mix damper during heating and during automatic stop of the engine is performed with overshoot.

In FIG. 7 illustrating the control without overshoot, as a result of the increase in the drive cycle time, a followability of the actual opening degree with respect to the target opening degree of the air mix damper 11 is deteriorated, and the actual opening degree becomes less than the target opening degree just in areas indicated by the dashed lines in FIG. 7. That is, a period of time in which a temperature of conditioned air fairly deviates from a desired value is undesirably increased.

On the other hand, in FIG. 8 illustrating an example of control with overshoot, according to the present invention, the followability with respect to the target opening degree is enhanced by the overshoot. That is, this feature is desirable in view of maintaining a desired temperature. The overshoot can be generated by increasing (when the target opening degree is changed in an increasing manner) or reducing (when the target opening degree is changed in a decreasing manner) the target opening degree, just by a given correction opening degree, and drivingly controlling the air mix damper 11 (motor 11A) to allow an opening degree thereof to conform to the corrected target opening degree. More specifically, for example, the corrected target opening degree can be obtained by calculating a given rate (e.g., 5%) of a deviation between the target opening degree and the actual opening degree, as a correction value, and adding (or subtracting) the correction value to (from) the target opening degree. During automatic stop of the engine, if a drive frequency (the number of times of drive) of the air mix damper 11 is set to the same value as that during running of the engine as illustrated in FIG. 6, the air mix damper 11 (motor 11A) will be alternately placed in driven and un-driven states frequently, so that a noise problem becomes prominent.

Figure 10:
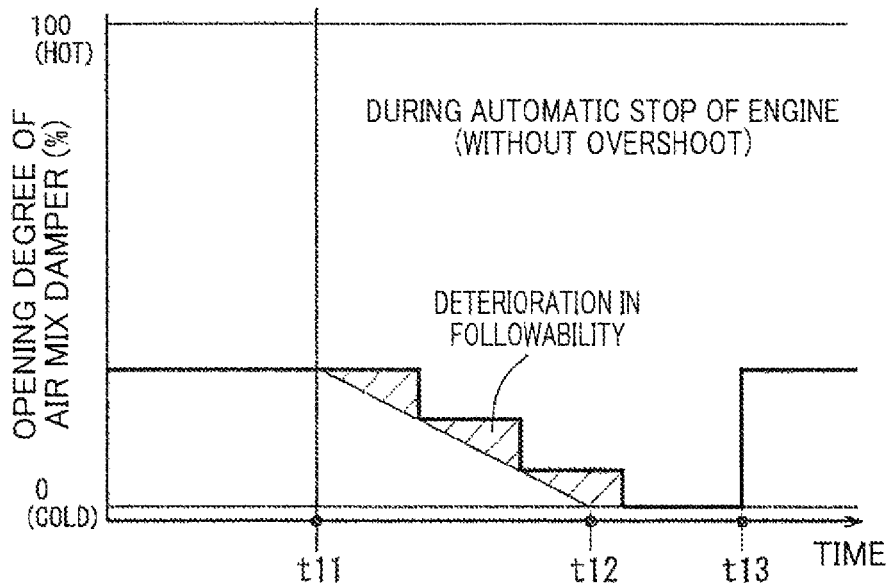
FIG. 10 is a time chart illustrating one example of reference control in which a change in opening degree of the air mix damper during cooling and during automatic stop of the engine is performed without overshoot.
Figure 11:
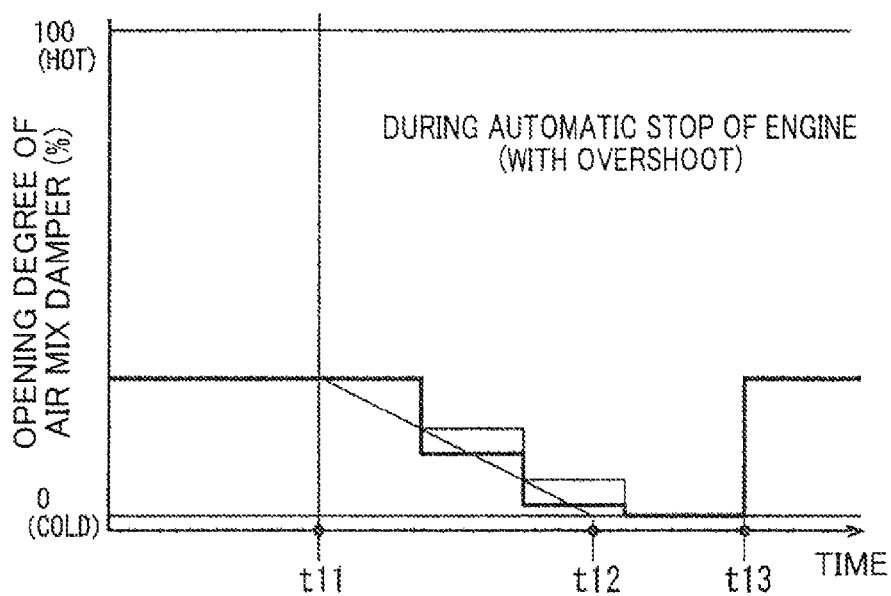
FIG. 11 is a time chart illustrating one example of control in which the change in opening degree of the air mix damper during cooling and during automatic stop of the engine is performed with overshoot.

FIGS. 9A to 9C, FIG. 10, and FIG. 11 illustrate an example of air-conditioning control during cooling, for example, in summertime. FIGS. 9A to 9C correspond, respectively, to FIGS. 6A to 6C. FIG. 10 and FIG. 11 correspond, respectively, to FIG. 7 and FIG. 8. Further, Time t11, Time t12 and Time t13 correspond, respectively, to Time t1, Time t2 and Time t3. Except that the target opening degree is gradually reduced toward 0%, the control during cooling is the same as that during heating, and any further detailed description will be omitted. It is to be understood that the air mix dampers 11, 12 may be subjected to the opening degree changing control, individually or independently, or may be synchronized with each other in terms of a timing of changing the opening degree.

Next, with reference to the flowchart in FIG. 12, a first example of the control according to the present invention will be described. In the following description, Q indicates Step. Further, the following description will be made with a focus on the air mix damper 11 (It is to be understood that the air mix damper 12 is controlled in the same manner as the air mix damper 11. The same applies to the flowcharts in FIGS. 13 and 14).

First of all, in Q1, counting of a timer is initiated (An initial value of the timer is 0). Subsequently, in Q2, the target opening degree of the air mix damper 11 (also, 12) is calculated, for example, in accordance with the formula illustrated in the block of the Q2. In this formula, the target blow temperature is calculated, for example, by correcting a preset temperature manually set by a passenger, depending on an outside air temperature, a vehicle interior temperature, a solar radiation amount or the like.

After completion of the Q2, it is determined in Q3 whether or not the current time is within the idling stop period. When the determination in the Q3 is NO, i.e., the current time is within the engine running period, it is determined in Q4 whether a deviation between the actual opening degree of the air mix damper 11 detected by the opening degree sensor 11B and the target opening degree of the air mix damper 11 calculated in the Q2 is equal to or greater than a given threshold value AMDnormal. When the determination in the Q4 is NO, it is evaluated that the change in opening degree of the air mix damper 11 is unnecessary, and the routine shifts to Q5. In the Q5, after ascertaining an elapse of a relatively short cycle time (e.g., 2 seconds) for calculation of the target opening degree, the routine returns to the Q1. When the determination in the Q4 is YES, the opening degree of the air mix damper 11 is changed to conform to the target opening degree (drive of the motor 11A), in Q6. The drive in the Q6 is based on control corresponding to that in FIG. 6C.

When the determination in the Q3 is YES, i.e., the current time is within the idling stop period, it is determined in Q7 whether or not (a count value of) the timer is a state after a given time or more has elapsed. When the determination in the Q7 is NO, the routine returns to Q2. The process returning from the Q7 to the Q2 serves as a process for waiting for an elapse of a relatively long cycle time (e.g., 15 seconds) which is a drive cycle time of the air mix damper 11.

When the determination in the Q7 is YES, the target opening degree changing control during the idling stop period is performed in Q8. That is, a corrected target opening degree is calculated by increasing or a reducing the target opening degree, just by a given correction opening degree. More specifically, when a current target opening degree calculated in the Q2 this time is increased in opening degree, the current target opening degree is increased (subjected to addition), just by a given correction opening degree, and the resulting opening degree is set as the corrected target opening degree. On the other hand, when a current target opening degree calculated in the Q2 this time is reduced in opening degree, the current target opening degree is reduced (subjected to subtraction), just by a given correction opening degree, and the resulting opening degree is set as the corrected target opening degree. After completion of the Q8, the opening degree of the air mix damper 11 is changed to conform to the corrected target opening degree (by driving the motor 11A), in Q9.

Figure 12:
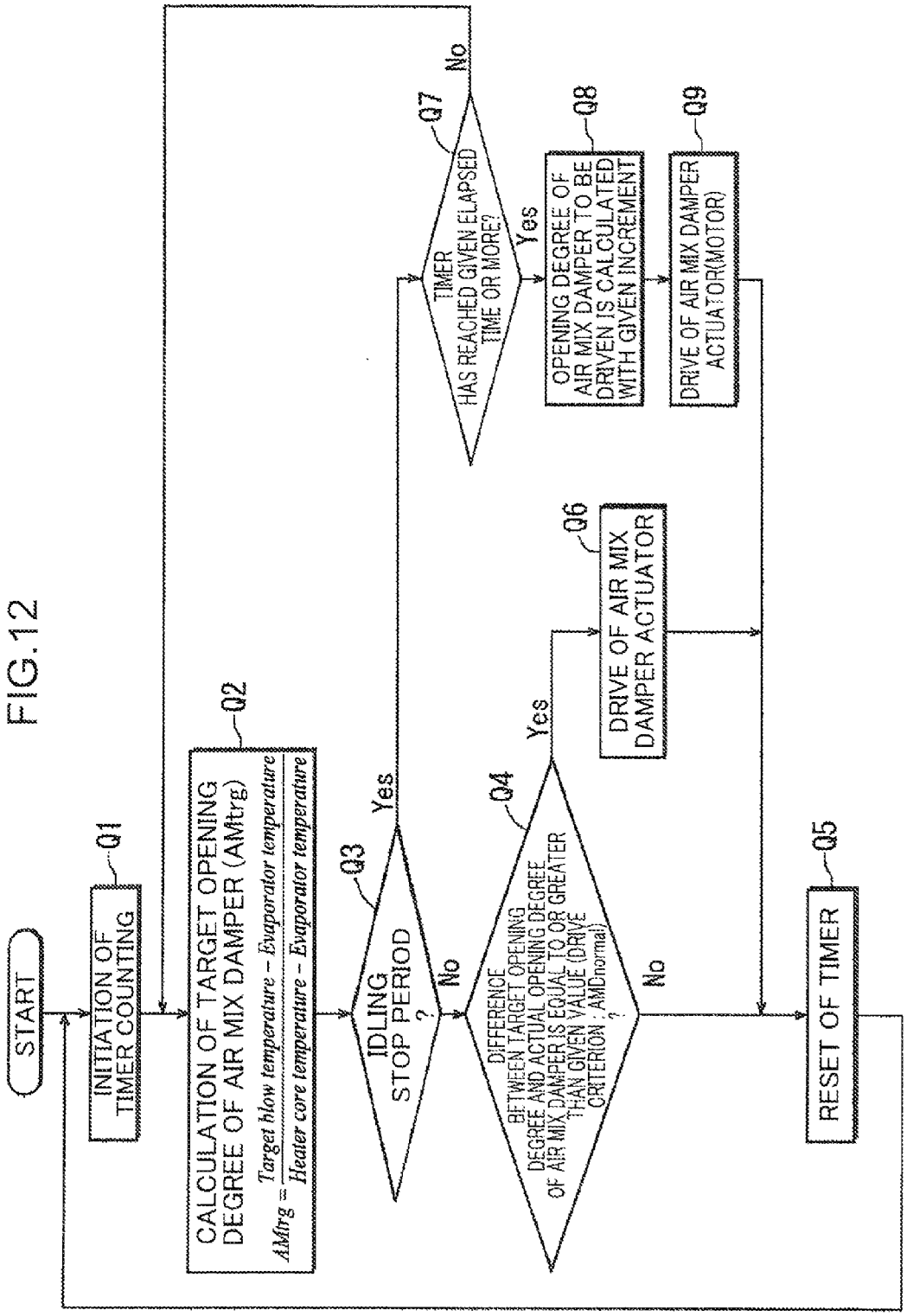
FIG. 12 is a flowchart illustrating a first example of the control according to the present invention.
Figure 13:
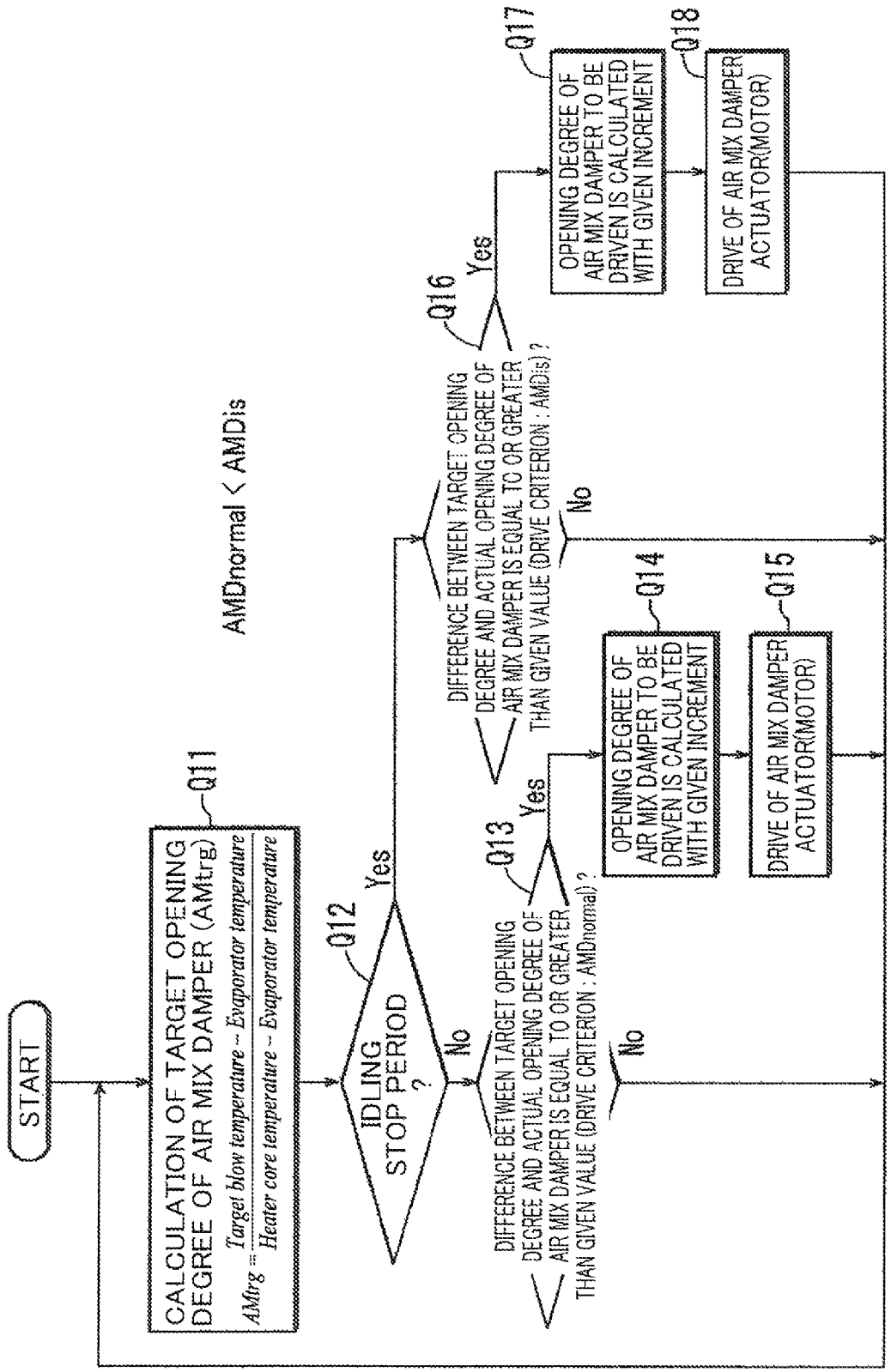
FIG. 13 is a flowchart illustrating a second example of the control according to the present invention.

FIG. 13 is a flowchart illustrating a second example of the control according to the present invention. In this example, the change in opening degree of the air mix damper 11 is performed on the condition that the deviation between the actual opening degree and the target opening degree of the air mix damper 11 is equal to or greater than a given threshold value. Further, with a view to reduction in drive frequency of the air mix damper 11, the given threshold value is set to a relatively small value AMDnormal during running of the engine, whereas it is set to a relatively large value AMDis (AMDis>AMDnormal) during engine stop of the engine. Therefore, the timer used in FIG. 12 is not employed. In FIG. 13, Q11 to Q13 correspond, respectively, to the Q2 to the Q4 in FIG. 12, and their duplicated description will be omitted.

In the control during running of the engine, when the determination in the Q13 is YES, a corrected target opening degree is calculated in Q14 (corresponding to the Q8 in FIG. 12). Subsequently, in Q15, the opening degree of the air mix damper 11 is changed to conform to the corrected target opening degree (by driving the motor 11A). As above, in the example in FIG. 13, the processing in the Q14 allows the overshoot control to be performed even during running of the engine. Alternatively, the processing in the Q14 may be omitted (i.e., when the determination in the Q13 is YES, the processing in the Q15 may be immediately performed).

When the determination in the Q12 is YES, i.e., the current time is within the idling stop period, it is determined in Q16 whether or not the deviation between the actual opening degree of the air mix damper 11 detected by the opening degree sensor 11B and the target opening degree of the air mix damper 11 calculated in the Q11 is equal to or greater than the given threshold value AMDis. When this determination is NO, the routine returns to Q11. On the other hand, when the determination in the Q16 is YES, a corrected target opening degree for performing overshoot is calculated in Q17 (corresponding to the Q8 in FIG. 12). Subsequently, in Q18, the opening degree of the air mix damper 11 is changed to conform to the corrected target opening degree (by driving the motor 11A). Illustration of a time chart corresponding to the second example is omitted, because it is the same as that illustrated in FIG. 8 or 11.

Figure 14:
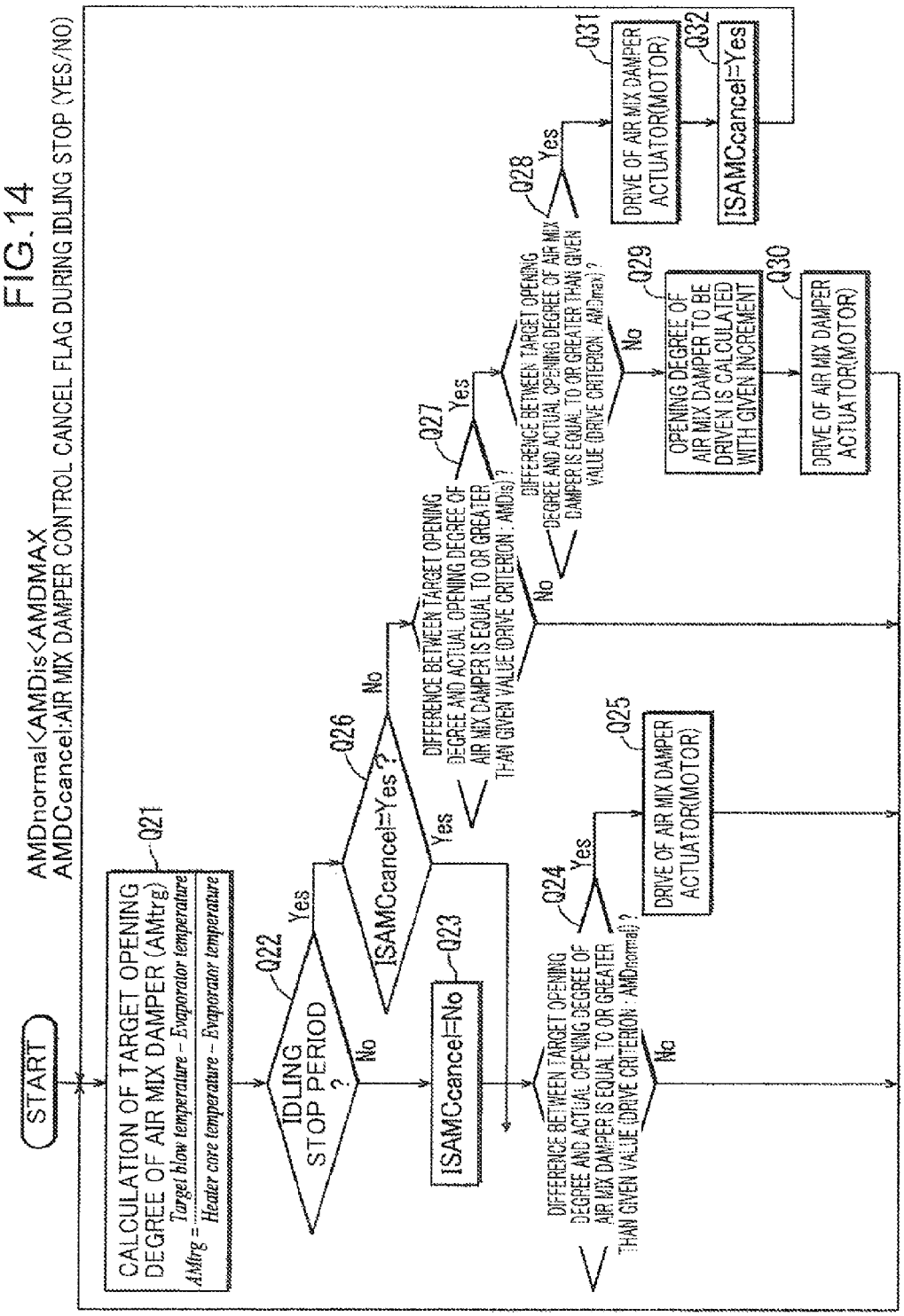
FIG. 14 is a flowchart illustrating a third example of the control according to the present invention.

FIG. 14 is a flowchart illustrating a third example of the control according to the present invention. In this example, when the deviation between the actual opening degree of the air mix damper 11 detected by the opening degree sensor 11B and the target opening degree of the air mix damper 11 is equal to or greater than an upper limit threshold value AMDmax (AMDmax>AMDis>AMDnormal), the opening degree changing control with overshoot is inhibited. That is, if the opening degree changing control with overshoot is performed when the deviation is excessively large, an amount of opening degree to be changed becomes excessively large in a situation where, after the engine is restarted, the opening degree of the air mix damper 11 is returned in a direction opposite to a direction for the change in opening degree during automatic stop of the engine, so that the followability with respect to the target opening degree just after restart of the engine is deteriorated. This example is intended to prevent such deterioration.

This example illustrated in FIG. 14 is a modification of the example illustrated in FIG. 13. That is, Q21 and Q22 correspond, respectively, to the Q11 and the Q12, and Q24, Q25, Q27, Q29 and Q30 correspond, respectively, to the Q13, the Q15, the Q16, the Q17 and the Q18.

Differences from the example in FIG. 13 are as follows. When the determination in the Q22 is NO, a cancel flag is set to "NO" (or "0"). When the cancel flag is set to "YES" (or "1"), it indicates that normal control identical to control during the engine running period is performed even during the idling stop period. Thus, when the determination in the Q22 is NO, i.e., during the engine running period, the cancel flag is set to "NO" in Q23.

When the determination in the Q22 is YES, i.e., during the idling stop period, it is determined in the Q26 whether or not the cancel flag is set to "YES". Just after entering the idling stop period, the determination in the Q26 is made as NO. Thus, in this case, it is determined in the Q27 whether or not the deviation between the actual opening degree of the air mix damper 11 detected by the opening degree sensor 11B and the target opening degree of the air mix damper 11 is equal to or greater than the relatively large, given threshold value AMDis. When the determination in the Q27 is NO, the routine returns to the Q21.

When the determination in the Q27 is YES, it is determined in the Q28 whether or not the deviation between the actual opening degree of the air mix damper 11 detected by the opening degree sensor 11B and the target opening degree of the air mix damper 11 is equal to or greater than the upper limit threshold value AMDmax. When this determination in Q28 is NO, processing in the Q29 and the Q30 (corresponding, respectively, to the Q8 and the Q9 in FIG. 12, and corresponding, respectively, to the Q17 and the Q18 in FIG. 13) is performed.

When the determination in the Q28 is YES, the opening degree of the air mix damper 11 is changed to conform to the target opening degree, in Q31, and then the cancel flag is set to "YES", in Q32. After passing through the Q32, the determination in the Q26 is made as YES even during the idling stop period, the normal opening degree changing control will be performed in the same manner as that during the engine running period, in the Q24 (at intervals of a relatively short drive cycle time and without overshoot).

Figure 15:
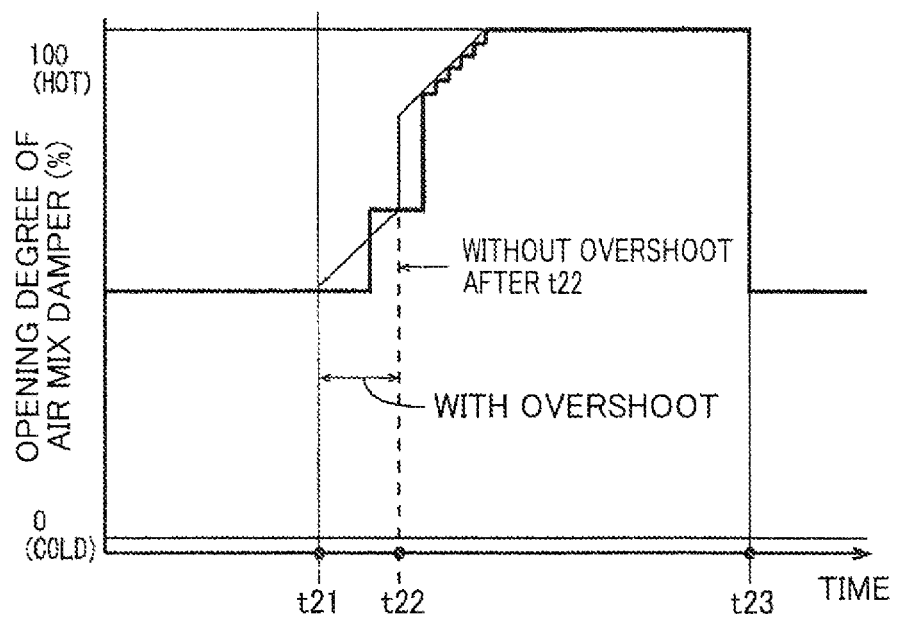
FIG. 15 is a time chart illustrating the third example of the control.

FIG. 15 illustrates a time chart corresponding to the third example. FIG. 15 illustrates the control during heating in wintertime, wherein Times t21 and t23 correspond, respectively, to the Times t1 and t3 in FIG. 6, and a period between the Time t21 and the Time t23 corresponds to the idling stop period. Further, the target opening degree is largely changed at the Time t22. The large change in target opening degree at the Time t22 occurs, for example, when a passenger manually operates a temperature setting switch. Then, after the Time t22, the drive cycle time of the air mix damper 11 is set to the same relatively short cycle time as that during running of the engine, and the overshoot control is not performed. When the engine is restarted after (particularly just after) the Time t22, it becomes possible to allow the opening degree of the air mix damper 11 to quickly conform to the target opening degree even in a situation where the cooling function of the evaporator 5 and the heating function of the heater core 10 are recovered, and thereby the target opening degree is largely reduced. In the example illustrated in FIGS. 14 and 15, the controller may be configured to, when the target opening degree is largely changed, prevent the change in target opening degree until the engine is subsequently restarted (inhibition of the change in target opening degree of the air mix damper 11). Except that the target opening degree and the actual opening degree are changed to form a line extending rightwardly and obliquely downwardly, a time chart during cooling has the same tendency as that during heating, and its illustration will be omitted.

Although the present invention has been described by way of the embodiment, it is to be understood that the present invention is not limited to the embodiment, but various changes and modifications may be made therein without departing from the spirit and scope thereof as set forth in appended claims. For example, the present invention may include the following changes or modifications. In the example in FIG. 13, the processing in the Q14 may be omitted. An amount of overshoot (correction opening degree) may be changed depending on a level of the deviation between the actual opening degree and the target opening degree of the air mix damper 11 (the overshoot amount becomes larger along with an increase in the deviation). Common temperature control for conditioned air may be employed for the driver seat area and the front passenger seat area without distinction (A specific embodiment is conceivable in which the partition wall 6 is removed, and conditioned air in the common chamber 9 is supplied to the air passages 13, 14). In a situation where the target opening degree during automatic stop of the engine is continuously set to 0% or 100% for a long period of time, it is desirable to automatically restart the engine. It is to be understood that an object of the present invention is not limited to explicitly-described ones, but implicitly includes providing substantially preferable matters or matters expressed as advantages.

The aforementioned present invention will be outlined as follows.

According to one aspect of the present invention, there is provided a vehicle air-conditioning control apparatus which is installed in a vehicle capable of performing automatic stop and automatic restart of an engine in accordance with a preset given condition. The vehicle air-conditioning control apparatus comprises: an air mix damper for changing a mixing ratio between cool air generated by a cool-air generator and warm air generated by a warm-air generator to thereby produce conditioned air having a desired temperature; an actuator for driving the air mix damper; a target opening degree determination device operable to determine a target opening degree of the air mix damper; a drive frequency reduction device operable, during automatic stop of the engine, to reduce a drive frequency of the actuator as compared to during running of the engine; a target opening degree correction device operable, during automatic stop of the engine and when a current target opening degree determined by the target opening degree determination device this time is greater than a previous target opening degree determined by the target opening degree determination device last time, to increase the current target opening degree just by a given opening degree, and set the resulting opening degree as a corrected target opening degree, and, during automatic stop of the engine and when the current target opening degree is less than the previous target opening degree, to reduce the current target opening degree just by a given opening degree, and set the resulting opening degree as a corrected target opening degree; and a drive control device operable, during running of the engine, to drivingly control the actuator to allow the air mix damper to have an opening degree conforming to the target opening degree determined by the target opening degree determination device, and, during automatic stop of the engine, to drivingly control the actuator to allow the air mix damper to have an opening degree conforming to the corrected target opening degree corrected by the target opening degree correction device.

In this vehicle air-conditioning control apparatus, during automatic stop of the engine, the frequency (number of times) of a change in opening degree of the air mix damper is reduced, so that it becomes possible to prevent or suppress noise accordingly. In addition, the opening degree of the air mix damper is changed while causing overshoot with respect to the target opening degree, so that it becomes possible to enhance followability with respect to the target opening degree (i.e., a desired air-conditioning temperature), as compared to control without overshoot. For comparison, if a conventional drive control toward the target opening degree (without overshoot) is performed, a period of time in which an actual opening degree fairly deviates from the target opening degree is undesirably increased, due to deterioration in functions of both of the cool-air generator and the warm-air generator (deterioration in followability with respect to the target opening degree).

Preferably, in the above vehicle air-conditioning control apparatus, the drive frequency reduction device is operable, during automatic stop of the engine, to increase a drive cycle time of the actuator as compared to during running of the engine.

According to this feature, the drive frequency of the actuator can be reduced by a simple technique of increasing the drive cycle time of the actuator.

Preferably, the above vehicle air-conditioning control apparatus comprises an actual opening degree detection device operable to detect an actual opening degree of the air mix damper, wherein the drive control device is configured to perform the drive control of the actuator, on a condition that a deviation between the actual opening degree detected by the actual opening degree detection device, and the target opening degree is equal to or greater than a given threshold value, and wherein the drive frequency reduction device is operable, during automatic stop of the engine, to change the given threshold value to a larger value as compared to during running of the engine.

According to this feature, the drive frequency of the actuator can be reduced by a simple technique of changing the given threshold value.

Preferably, in the above vehicle air-conditioning control apparatus, the drive frequency reduction device is configured such that, when the target opening degree is largely changed by a given value or more, it is inhibited from performing the reduction of the drive frequency, until the engine is subsequently restarted.

That is, when the control involved with overshoot is performed, the air mix damper has an opening degree greater than an actually required value, which would cause deterioration in response when the engine is restarted after automatic stop of the engine, and normal control is resumed. In contrast, the above feature is desirable in view of suppressing such deterioration in response on resume.

Preferably, in the above vehicle air-conditioning control apparatus, the target opening degree determination device is configured such that, when the target opening degree is largely changed by a given value or more, it is inhibited from changing the target opening degree, until the engine is subsequently restarted.

This feature is also effective in view of suppressing the deterioration in response on resume.

According to another aspect of the present invention, there is provided a vehicle air-conditioning control apparatus which installed in a vehicle capable of performing automatic stop and automatic restart of an engine in accordance with a preset given condition. The vehicle air-conditioning control apparatus comprises: an air mix damper for changing a mixing ratio between cool air generated by a cool-air generator and warm air generated by a warm-air generator to thereby produce conditioned air having a desired temperature; an actuator for driving the air mix damper; a target opening degree determination device for determining a target opening degree of the air mix damper; and a drive control device for drivingly controlling the actuator to allow an opening degree of the air mix damper to conform to the target opening degree determined by the target opening degree determination device, wherein the drive control device is operable, during automatic stop of the engine, to allow the actuator to be driven at intervals of a constant cycle time longer than that during running of the engine.

In this vehicle air-conditioning control apparatus, during automatic stop of the engine, the frequency (number of times) of a change in opening degree of the air mix damper is reduced, so that it becomes possible to prevent or suppress noise accordingly. In addition, the change in opening degree of the air mix damper is performed at intervals of a constant cycle, so that it becomes possible to allow a passenger to clearly recognize a normal operation of an air-conditioning system, while further suppressing noise. This also allows the passenger to recognize that the engine is in an automatically stopped state without any abnormality, and will be reliably restarted. Thus, this feature is desirable in view of relieving passenger's concern.

Preferably, the above vehicle air-conditioning control apparatus further comprises a target opening degree correction device operable, during automatic stop of the engine and when a current target opening degree determined by the target opening degree determination device this time is greater than a previous target opening degree determined by the target opening degree determination device last time, to increase the current target opening degree just by a given opening degree, and set the resulting opening degree as a corrected target opening degree, and, during automatic stop of the engine and when the current target opening degree is less than the previous target opening degree, to reduce the current target opening degree just by a given opening degree, and set the resulting opening degree as a corrected target opening degree, wherein the drive control device is operable, during running of the engine, to drivingly control the actuator to allow the air mix damper to have an opening degree conforming to the target opening degree determined by the target opening degree determination device, and, during automatic stop of the engine, to drivingly control the actuator to allow the air mix damper to have an opening degree conforming to the corrected target opening degree corrected by the target opening degree correction device.

According to this feature, when the drive frequency of the air mid damper is reduced during automatic stop of the engine, the opening degree of the air mix damper is changed while causing overshoot with respect to the target opening degree, so that it becomes possible to enhance followability with respect to the target opening degree (i.e., a desired air-conditioning temperature), as compared to control without overshoot. For comparison, if a conventional drive control toward the target opening degree (without overshoot) is performed under the condition that the drive frequency of the air mid damper is reduced, a period of time in which an actual opening degree fairly deviates from the target opening degree is undesirably increased, due to deterioration in functions of both of the cool-air generator and the warm-air generator (deterioration in followability with respect to the target opening degree).

What is claimed is:

1. A vehicle air-conditioning control apparatus installed in a vehicle capable of performing automatic stop and automatic restart of an engine in accordance with a preset given condition, comprising:
   an air mix damper for changing a mixing ratio between cool air generated by a cool-air generator and warm air generated by a warm-air generator to thereby produce conditioned air having a desired temperature;
   an actuator for driving the air mix damper;
   a target opening degree determination device operable to determine a target opening degree of the air mix damper;
   a drive frequency reduction device operable, during automatic stop of the engine, to reduce a drive frequency of the actuator as compared to during running of the engine;
   a target opening degree correction device operable, during automatic stop of the engine and when a current target opening degree determined by the target opening degree determination device this time is greater than a previous target opening degree determined by the target opening degree determination device last time, to increase the current target opening degree just by a given opening degree, and set the resulting opening degree as a corrected target opening degree, and, during automatic stop of the engine and when the current target opening degree is less than the previous target opening degree, to reduce the current target opening degree just by a given opening degree, and set the resulting opening degree as a corrected target opening degree;
   a drive control device operable, during running of the engine, to drivingly control the actuator to allow the air mix damper to have an opening degree conforming to the target opening degree determined by the target opening degree determination device, and, during automatic stop of the engine, to drivingly control the actuator to allow the air mix damper to have an opening degree conforming to the corrected target opening degree corrected by the target opening degree correction device; and
   an actual opening degree detection device operable to detect an actual opening degree of the air mix damper,
   wherein the drive control device is configured to perform the drive control of the actuator, on a condition that a deviation between the actual opening degree detected by the actual opening degree detection device, and the target opening degree is equal to or greater than a given threshold value, wherein the drive frequency reduction device is operable, during automatic stop of the engine, to change the given threshold value to a larger value as compared to during running of the engine, and wherein the drive frequency reduction device is operable, during automatic stop of the engine, to increase a drive cycle time of the actuator as compared to during running of the engine.

2. The vehicle air-conditioning control apparatus as defined in claim 1, wherein the drive frequency reduction device is configured such that, when the target opening degree is largely changed by a given value or more, it is inhibited from performing the reduction of the drive frequency, until the engine is subsequently restarted.

3. The vehicle air-conditioning control apparatus as defined in claim 2, wherein the target opening degree determination device is configured such that, when the target opening degree is largely changed by a given value or more, it is inhibited from changing the target opening degree, until the engine is subsequently restarted.

4. The vehicle air-conditioning control apparatus as defined in claim 1, wherein the target opening degree determination device is configured such that, when the target opening degree is largely changed by a given value or more, it is inhibited from changing the target opening degree, until the engine is subsequently restarted.

5. A vehicle air-conditioning control apparatus installed in a vehicle capable of performing automatic stop and automatic restart of an engine in accordance with a preset given condition, comprising:

an air mix damper for changing a mixing ratio between cool air generated by a cool-air generator and warm air generated by a warm-air generator to thereby produce conditioned air having a desired temperature;

an actuator for driving the air mix damper;

a target opening degree determination device for determining a target opening degree of the air mix damper;

a drive control device for drivingly controlling the actuator to allow an opening degree of the air mix damper to conform to the target opening degree determined by the target opening degree determination device, the drive control device being operable, during automatic stop of the engine, to allow the actuator to be driven at intervals of a constant cycle time longer than that during running of the engine; and a target opening degree correction device operable, during automatic stop of the engine and when a current target opening degree determined by the target opening degree determination device this time is greater than a previous target opening degree determined by the target opening degree determination device last time, to increase the current target opening degree just by a given opening degree, and set the resulting opening degree as a corrected target opening degree, and, during automatic stop of the engine and when the current target opening degree is less than the previous target opening degree, to reduce the current target opening degree just by a given opening degree, and set the resulting opening degree as a corrected target opening degree, wherein the drive control device is operable, during running of the engine, to drivingly control the actuator to allow the air mix damper to have an opening degree conforming to the target opening degree determined by the target opening degree determination device, and, during automatic stop of the engine, to drivingly control the actuator to allow the air mix damper to have an opening degree conforming to the corrected target opening degree corrected by the target opening degree correction device.

* * * * *